(12) United States Patent
Richter et al.

(10) Patent No.: US 6,590,098 B2
(45) Date of Patent: Jul. 8, 2003

(54) METHOD OF PREPARING ALIPHATIC POLYISOCYANATES WITH URETDIONE, ISOCYANURATE AND IMINOOXADIAZINDIONE STRUCTURES

(75) Inventors: Frank Richter, Leverkusen (DE); Reinhard Halpaap, Odenthal (DE); Jürgen Köcher, Langenfeld (DE); Hans-Josef Laas, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/144,643

(22) Filed: May 13, 2002

(65) Prior Publication Data

US 2003/0078361 A1 Apr. 24, 2003

(30) Foreign Application Priority Data

May 14, 2001 (DE) .......................... 101 23 419

(51) Int. Cl.[7] ................... C07D 251/34; C07D 229/00; C07D 273/04; C07D 265/04; C07C 263/16
(52) U.S. Cl. ................... 540/202; 544/67; 544/222; 548/951; 548/952; 560/330; 560/336; 560/355; 252/182.2; 252/182.21
(58) Field of Search .............. 540/202; 544/67, 544/222; 548/951, 952; 560/330, 336, 355; 252/182.2, 182.21

(56) References Cited

U.S. PATENT DOCUMENTS

| 3,252,945 A | 5/1966 | Ugi et al. ............. 528/51 |
|---|---|---|
| 4,324,879 A | 4/1982 | Bock et al. ............ 528/45 |
| 4,537,961 A | 8/1985 | Robin ................. 544/193 |
| 4,697,014 A | 9/1987 | Robin ................. 544/193 |
| 5,691,438 A | 11/1997 | Konig et al. ............ 528/45 |
| 5,914,383 A | 6/1999 | Richter et al. .......... 528/59 |
| 6,239,276 B1 | 5/2001 | Gupta et al. ........... 544/213 |
| 2001/0031867 A1 | 10/2001 | Gupta et al. ........... 544/215 |
| 2002/0013462 A1 | 1/2002 | Gupta et al. ........... 544/215 |

FOREIGN PATENT DOCUMENTS

| CA | 2244486 | 6/1999 |
|---|---|---|
| DE | 198 28 935 | 12/1999 |
| GB | 1153815 | 5/1969 |
| WO | 99/07765 | 2/1999 |
| WO | 99/23128 | 5/1999 |

OTHER PUBLICATIONS

Laas H J Et Al: "Zur Synthese Aliphatischer Polyisocyanate–Lackpolyisocyanate Mit Biuret–, Isocyanaurat– order Uretdionstruktur the synthesis of aliphatic polyisocyanates containing biuret, isocyanurate or uretdione backbones for use in coatings" Journal fur praktische chemie, chemiker zeitung, wiley vch, weinheim, de Bd. 336, Nr. 3, 1994, Seiten 185–200, XP000441642 ISSN:1436–9966 Seite 192—Seite 194.

Primary Examiner—Rabon Sergent
(74) Attorney, Agent, or Firm—Joseph C. Gil; Thomas W. Roy

(57) ABSTRACT

The invention relates to a method of preparing an aliphatic polyisocyanate by conversion of an aliphatic diisocyanate to a polyisocyanates in the presence of a catalyst, wherein the catalyst contains a saline compound having 5 to 97.1 wt. % of a 1,2,3- and/or a 1,2,4-triazolate (calculated as $C_2N_3$, molecular weight 66) in the anion, the isocyanates thus prepared and the polyurethane paints and coatings containing them.

8 Claims, No Drawings

METHOD OF PREPARING ALIPHATIC POLYISOCYANATES WITH URETDIONE, ISOCYANURATE AND IMINOOXADIAZINDIONE STRUCTURES

BACKGROUND OF THE INVENTION

The invention relates to a method of preparing aliphatic polyisocyanates with uretdione, isocyanurate or iminooxadiazindione structures, the isocyanates thus prepared and polyurethane paints and coatings containing them.

Oligomerization of isocyanates is a long-known, generally accepted method of modifying low molecular weight isocyanates, which are usually difunctional, in order to obtain products with advantageous application properties for example in the paint and coating sector. These oligomeric isocyanates will be referred to generally as polyisocyanates in this specification (*J. Prakt. Chem./Chem. Ztg* 1994, 336, 185–200). Polyisocyanates based on aliphatic diisocyanates are normally used for light-resistant, non-yellowing paints and coatings. The term "aliphatic" refers to the carbon atoms to which the NCO groups of the monomer are bonded, i.e. the compound molecule may perfectly well contain aromatic rings, which do not carry NCO groups.

One can distinguish between different products and processes according to the type of structure mainly formed from the previously free NCO groups in the respective oligomerization reaction.

Particularly important procedures are so-called dimerization to form uretdione structures of formula 1, described for example in DE-A 16 709 720 and so-called trimerization to form isocyanate structures of formula 2, described for example in EP-A 0 010 589. In addition to the last-mentioned trimers isomeric (i.e. also trimeric) products with an iminooxadiazindione structure of formula 3 can be obtained for example according to the teaching of EP-A 0 798 299. If this specification refers to both isomeric trimers, isocyanurates and iminooxadiazindiones, it will generally be speaking of trimers or trimerized compounds, otherwise the exact term will be used.

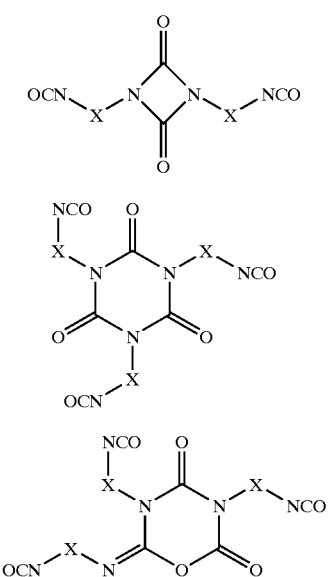

R=difunctional substituent

Complete conversion of all monomeric diisocyanate molecules OCN-R-NCO in one reaction step would in practice lead to high molecular weight, extremely high-viscosity or gel-like products which would be useless in the paint and coatings sector, owing to further reaction of the NCO groups in ideal structures 1 to 3. In catalyzed preparation of polyisocyanates for paint the industrial procedure is therefore to convert only part of the monomer, to stop any further reaction by adding a catalyst poison (a "stopper") then to separate the non-converted monomer. The aim is to have to separate the smallest possible proportion of non-converted monomer at the lowest possible viscosity of the low-monomer polyisocyanate paint resin, i.e. to obtain high conversion in the reaction accompanied by a high resin yield at the following processing stage with high-level properties of the polyisocyanate resins.

Dimers based on aliphatic diisocyanates have a far lower viscosity than trimers. However they have a strictly linear, i.e. NCO-difunctional structure regardless of the degree of conversion or the resin yield. Trimers on the other hand have the higher functionality required for a high crosslink-density in the polymer and consequent good stability properties thereof. Their viscosity increases very rapidly though with increasing conversion in the reaction. Compared with isomeric isocyanurates iminooxadiazindiones have far lower viscosity with the same NCO-functionality of the polyisocyanate resin (cf. Proc. of the XXIVth Fatipec Conference, Jun. 8–11, 1998, Interlaken, CH, vol. D, pp. D-136–137), though they do not reach the viscosity level of uretdiones.

In practice the products formed are not only those which give their names to the reaction (dimers in dimerization, trimers in trimerization) but nearly always the other reaction products simultaneously (trimers in dimerization, uretdiones in trimerization). However the content of these is low.

Thus trimers are always contained in the polyisocyanates accessible from the teaching of DE-A 16 70 720 (trialkylphosphine-catalyzed dimerization, cf. also comparative example 1). Their content can be increased somewhat with higher conversion (conversion-dependent selectivity) and by raising the temperature. However carbodiimides and secondary products thereof, particularly uretone imines are also formed increasingly in the latter case. The negative role of such products in the technology of aliphatic polyisocyanates and poor monomer stability in particular have been described elsewhere (cf. EP-A 798 299, p.4, line 42 to p.5, line 15). Their formation is thus undesirable in all cases and stands in the way of wide, hazard-free use of such polyisocyanates. The molar uretdione content of carbodiimide-free and uretone imine-free products prepared according to DE-A 16 70 720 is generally over 60%. In this specification the term "mol %" will, unless otherwise stated, always refer to the sum of structure-types formed by the modifying reaction (oligomerization) from the previously free NCO groups of the respective monomer. The molar content can be determined for example by NMR spectroscopic methods (cf. Examples).

Oligomerization of aliphatic diisocyanates with N-silyl compounds, described for example in EP-A 57 653, EP-A 89 297, EP-A 187 105, EP-A 197 864 and WO 99/07765 (cf. also comparative Example 2), is to a certain extent the counterpart of phosphine catalysis with the content of trimers and uretdiones reversed. One drawback here is that the selectivity of catalysis is highly dependent on conversion—the uretdione content of the polyisocyanates drops sharply as conversion increases—another is that the iminooxadiazindione content of the resins is very low, always well below 5 mol %. According to the teaching of WO 99/07765 step-by-step modification is possible through thermally induced, i.e. non-catalyzed or rather self-catalyzed uretdione formation preceding the silylamine-catalyzed trimerization. Apart from the above-mentioned general drawbacks of silylamine catalysis this procedure however has the disadvantage that thermally induced uretdione formation is a slow process, leading to long, industrially unacceptable overall reaction times, particularly if there is an attempt to obtain a higher uretdione content. The molar uretdione content of the products of WO 99/07765 is not more than 30%.

In products accessible from the teaching of EP-A 798 299, i.e. trimerized compounds with a high content of iminooxadiazindione structures, the uretdione content is similarly low (<<20 mol %) relative to the sum of isocyanurate and iminooxadiazindione structures. The selectivity of the reaction is also dependent on conversion and temperature.

Good methods for obtaining polyisocyanates for paints with the lowest possible viscosity and the highest possible NCO-functionality can be characterized as follows:

1. The trimerization reaction is interrupted at very low conversion rates as the higher-molecular type of compound with more than one isocyanurate ring per molecule, which is responsible for the increase in viscosity, is not yet very advanced then, or
2. polyisocyanates of the uretdione type are mixed with trimerized compound resins; here the uretdione component is so to speak the reactive diluent.

Yet both methods have specific disadvantages. Thus in the first method the resin yield is very small, giving rise not only to technical problems (separating a large quantity of monomer) but also to economic ones (space-time yield) and ecological drawbacks (energy consumption). When different paint resins are mixed, apart from the general drawback of having an additional step in the process it must be realized that viscosity will be increased by the build-up of molecular weight through the consecutive addition of further monomer molecules to the NCO groups of ideal structure 1 (polymer chain formation), even in the preparation of dimerized compounds with higher conversion; this is so even if the increase in viscosity is not as marked as with trimerized compounds (star-shaped progress of oligomer build-up). Hence dimerized resins which are suitable as reactive diluents are similarly produced with a relatively low resin yield.

It was an object of the invention to provide a method of preparing polyisocyanates based on aliphatic diisocyanates, which have a high content of uretdione structures in addition to trimer structures. They have to be prepared in one reaction stage, i.e. without stages preceding or following the catalyzed reaction such as physical mixing of different resins, pre-reaction tempering and others. The structural composition of the polyisocyanates, i.e., the molar ratio of uretdione, isocyanurate and iminooxadiazindione structures to each other, must be relatively independent of the conversion and be distinguished by low product viscosity with high NCO-functionality and high resin yield.

It has been found that the object is achieved according to the invention by the use of saline compounds from the range of de-protonized 1,2,3- and 1,2,4-triazoles as catalysts for oligomerizing monomeric aliphatic isocyanate.

The invention is based on the surprising observation that the effect of saline compounds from the range of 1,2,3- and 1,2,4-triazoles (triazolates) on aliphatic isocyanates, apart from producing isocyanurate structures, simultaneously leads firstly, to a considerable extent, to the formation of iminooxadiazindione structures isomeric to the latter, but secondly can form a high uretdione content in the products. What is particularly surprising is that the selectivity of the reaction, i.e. the molar ratio of the different types of structure to each other, is hardly dependent on the extent of monomer conversion.

Products with such a combination of different types of oligomer structure cannot be obtained by any single-stage state of the art isocyanate oligomerizing process. It is also novel to obtain a molar ratio of the different types of structure which is almost independent of conversion when the polyisocyanate has a high uretdione content.

Generally speaking it is hardly possible to predict the selectivity of isocyanate-oligomerizing catalysts. Here empirical tests are still required. Although neutral heterocycles carrying N13 H— or N-alkyl groups have already been introduced in polyisocyanate chemistry they are used almost exclusively in applications as blocking agents for NCO-groups (derivatives containing NH-groups, cf. EP-A 0 741 157) or as stabilisers to prevent UV-induced decomposition of paint films made from polyisocyanates, for example substituted benzotriazoles containing other OH groups in the molecule, for example DE-A 198 28 935, WO 99/67226 and literature quoted therein.

What is attempted here is not oligomerization of isocyanate groups but their thermally reversible deactivation to allow single-component processing or stabilisation respectively of the polyurethane plastic or paint. Oligomerization of isocyanate groups would even be a disadvantage in either case.

SUMMARY OF THE INVENTION

The invention relates to a method of preparing an aliphatic polyisocyanate by conversion of an aliphatic diisocyanate to a polyisocyanates in the presence of a catalyst, wherein the catalyst contains a saline compound having 5 to 97.1 wt. % of a 1,2,3- and/or a 1,2,4-triazolate (calculated as $C_2N_3$, molecular weight 66) in the anion. The invention also relates to polyisocyanates obtained by this method and the polyurethane plastics and coatings containing them.

DETAILED DESCRIPTION OF THE INVENTION

Suitable aliphatic isocyanates include any regio and stereo-isomers of the following isocyanates: bis(isocyanate alkyl)ether, bis- and tris-(isocyanate alkyl)-benzenes, -toluenes and -xylenes, propane diisocyanates, butane diisocyanates, pentane diisocyanates, hexane diisocyanates (for example hexamethylene diisocyanate, HDI), heptane diisocyanates, octane diisocyanates, nonane diisocyanates (for example trimethyl-HDI, generally as a mixture of 2,4,4- and 2,2,4-isomers, TMDI) and triisocyanates (for example 4-isocyanate methyl-1,8-octane diisocyanate), decane di- and triisocyanates, undecane di- and triisocyanates, dodecane di- and triisocyanates, 1,3- and 1,4-bis(isocyanate methyl)cyclehaxane ($H_6XDI$), 3-isocyanate methyl-3,5,5-trimethylcyclohexyl isocyanate (isophorone diisocyanate, IPDI), bis-(4-isocyanate cyclohexyl)methane ($H_{12}MDI$) and bis(isocyanate methyl) norbornane (NBDI).

The starting materials for preparing the polyisocyanates obtainable by the method of the invention are in particular aliphatic diisocyanates which have 4 to 20 carbon atoms in the carbon network apart from the NCO groups, the NCO groups being bonded to primary aliphatic carbon atoms.

Preferred aliphatic diisocyanates include HDI, TMDI, 2-methylpentane-1,5-diisocyanate (MPDI), 1,3-and 1,4-bis (isocyanate methyl)cyclohexane ($H_6XDI$, optionally as an isomeric mixture) and/or bis(isocyanate methyl)norbornane (NBDI optionally as an isomeric mixture).

Part-use of monofunctional isocyanates is also possible in special cases but is not preferred.

The production process for the initial isocyanates to be used in the method of the invention is not critical to carrying out the method, thus the initial isocyanates may be produced with or without using phosgene. Some of the catalysts used in the method of the invention are commercially available, for example as sodium salts. On the other hand they can be produced very easily, for example if counter-ions other than Na+ are to be used for the catalytically active anion. Details can be found in the examples.

The catalysts used are saline compounds containing in the anion triazolate structures of formulae (I) and/or (II)

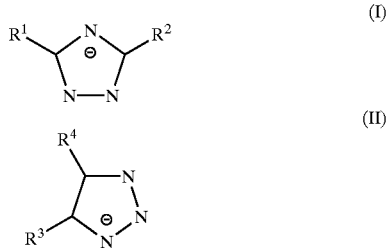

where $R^1$, $R^2$, $R^3$ and $R^4$ independently represent hydrogen, fluorine, chlorine, bromine, nitro, a saturated or unsaturated aliphatic or cycloaliphatic radical, a substituted or unsubstituted aromatic or araliphatic radical having up to 20 carbon atoms and optionally up to 3 heteroatoms selected from the group consisting of oxygen, sulphur and nitrogen and which may optionally be substituted by halogen atoms or nitro groups, and where $R^3$ and $R^4$, combined and together with the carbon atoms of the 1,2,3-triazolate five-ring compound and optionally a further nitrogen atom or an oxygen atom, can form annellated rings with 3 to 6 carbon atoms.

The catalysts used are preferably saline compounds which contain in the anion triazolate structures of formula (I), where $R^1$ and $R^2$ independently represent a hydrogen atom, a halogen atom from the fluorine, chlorine or bromine range or a nitro group, a saturated aliphatic or cycloaliphatic radical, a optionally substituted aromatic or araliphatic radical which contains up to 12 carbon atoms and optionally up to 3 heteroatoms from the oxygen, sulphur and nitrogen range and which may optionally be substituted by halogen atoms or nitro groups, and saline compounds which contain in the anion triazolate structures of formula (II), where $R^3$ and $R^4$ independently represent a hydrogen atom, a halogen atom from the fluorine, chlorine or bromine range or a nitro group, a saturated or unsaturated aliphatic or cycloaliphatic radical, a optionally substituted aromatic or araliphatic radical which contains up to 12 carbon atoms and optionally up to 3 heteroatoms from the oxygen, sulphur and nitrogen range and which may optionally be substituted by halogen atoms or nitro groups and, combined and together with the carbon atoms of the 1,2,3-triazolate five-ring compound and optionally a further nitrogen atom or an oxygen atom, can form annellated rings with 3 to 6 carbon atoms.

The optimum "design" of the anion in respect of catalytic activity, thermal stability and the selectivity of the reaction for the problem posed above may further be adapted to the isocyanate to the oligomerized or to the desired reaction conditions by appropriate substitution in the heterocyclic five-ring compound. Saline catalysts with a triazolate anion are generally suitable for preparing the polyisocyanates according to the invention, and in the neutral form of triazole at least one Zerewittinoff-active hydrogen atom bonded to a cyclic nitrogen atom has to be present. Some examples of these triazoles with NH groups on which the catalysts include 1,2,3- and 1,2,4-triazole and substituted derivatives, derived by replacing one or both C-bonded H atoms with optionally substituted (O, N, S, halogen) alkyl or aryl groups, for example 4-chloro-5-carbomethoxy-1,2,3-triazole, 4-chloro-5-cyano-1,2,3-triazole or 3,5-dibromotriazole. In the 1,2,3-triazoles finally the two adjacent C atoms may themselves again be part of an annellated ring system optionally containing further heteroatoms (O, N, S). Some examples of these are 1,2,3-benzotriazole and substituted 1,2,3-benzotriazoles such as 5-fluoro-1,2,3-benzotriazole, 5-trifluoromethyl-1,2,3-benzotriazole, 5-nitro-1,2,3-benzotriazole, 5-methoxy-1,2,3-benzotriazole, 5-chloro-1,2,3-benzotriazole, 5-tetrafluoroethoxy-1,2,3-benzotriazole, 5-trifluorothio-1,2,3-benzotriazole, 4,6-bis(trifluoromethyl)-1,2,3-benzotriazole, 4-trifluoromethoxy-5-chloro-1,2,3-benzotriazole and heteroaromatically annellated 1,2,3-triazoles such as isomeric pyridine triazoles for example 1H-1,2,3-triazol[4,5-b]pyridine—hereinafter referred to briefly as pyridine triazole- and azapurin. Salts of 1,2,4-triazole, 1,2,3-triazole, 1,2,3-benzotriazole and/or pyridine triazole are preferred as catalysts in the method of the invention.

The above-mentioned compounds are predominantly substances which are known from the literature. The synthesis of the fluorine-containing derivatives is described for example in DE-A 43 02 461. The cation for the catalysts used in the method of the invention may vary widely. If the catalyst or its secondary products formed in the course of deactivation are to be separated from the product after the oligomerization reaction, it may be advantageous to employ polar, highly charged counter-ions such as alkaline or alkaline earth cations. If the catalyst has to be distributed as homogeneously as possible in the isocyanate (mixture) used for the reaction and the polyisocyanate resin, lipophilic ones such as ammonium or phosphonium types can be chosen. The latter can for example be prepared without any problems simply by combining a sodium triazolate and an ammonium or phosphonium chloride, preferably in solvents which do not readily dissolve the sodium chloride formed, and bringing the mixture to the desired concentration and purity by filtration and subsequent reduction. During the last processing stage residues of initially dissolved sodium chloride are generally also precipitated and can be filtered off. Some examples of suitable ammonium or phosphonium chlorides are tetra-methyl, -ethyl, -propyl, -butyl, -hexyl and -octyl ammonium chloride but also ammonium salts which are substituted mixed, such as benzyl-trimethylammonium chloride or methyl-trialkylammonium chlorides where alkyl stands for straight-chain or branched $C_8$ to $C_{10}$ radicals (brand name for example Aliquat or Adogen) and tetra-ethyl, -propyl, -butyl, -hexyl and -octyl-phosphonium chloride, but also phosphonium salts which are substituted mixed, such as alkyl-triethyl, tributyl, trihexyl, trioctyl and/or tridodecylphosphonium chloride, where alkyl stands for straight-chain or branched $C_4$ to $C_{20}$ radicals (brand name for example Cyphos, such as Cyphos443, Cyphos3453, Cyphos3653 and others).

The catalyst concentrations employed when carrying out the method of the invention are between 5 ppm and 5%, preferably between 10 ppm and 1 wt. %, relative to the mass of the initial (di)isocyanate or (di)isocyanate mixture used and the mass of catalyst used.

The catalysts employed in the method of the invention may be used without solvent or in solution. The solvents may basically be any substances in which the catalyst can dissolve without decomposition and which do not react with isocyanates or react with them only to form secondary products that are common in polyurethane chemistry such as ureas, biurets, urethanes and allophanates. If catalyst solvents are employed they are preferably reactive compounds which react with the diisocyanates used as starting components to form secondary products that are common in polyurethane chemistry; hence these compounds need not be separated after the reaction. They include straight-chain or branched alcohols, optionally containing more than one OH group, with 1 to 20 carbon atoms and optionally other heteroatoms, preferably oxygen, in the molecule. Some examples are methanol, ethanol, 1- and 2-propanol, isomeric butanols, 2-ethylhexanol, 2-ethylhexane-1,3-diol, 1,3- and 1,4-butanediol and 1-methoxy-2-propanol. It is particularly advantageous that the above catalysts may be used even in very concentrated solution yet hardly cause any spontaneous over-curing in the starting material.

There are known methods of inhibiting further reaction when the desired stage has been reached ("stopping" the reaction), such as removing the catalyst by extraction or filtration—the latter optionally after adsorptive bonding to inert carrier materials—making the catalyst system inactive by thermal deactivation and/or by adding (sub) stoichiometric quantities of acids or acid derivatives including for example benzoyl chloride, phthaloyl chloride, phosphinous, phosphonous and/or phosphorous acid, phosphinic, phosphonic and/or phosphoric acid, acid esters of the 6 last-mentioned acid types, sulphuric acid and its acid esters and/or sulphonic acids.

In a special embodiment of the method the polyisocyanates may be prepared in a continuous operation, i.e. in a pipe reactor.

The method of the invention can be carried out without any modifying stages preceding or following the catalyzed oligomerization reaction, such as thermal activation of the initial (di)isocyanate(s) before the catalyst is added or subsequent mixing of different resins.

Catalytic conversion according to the invention may take place within a very wide temperature range. Reaction temperatures above 0° C. are normal; the preferred operating range is from 20 to 100° C. and the more preferred one from 40 to 90° C.

The products of the method according to the invention may be separated and purified by known processes such as thin-layer distillation, extraction, crystallization and/or molecular distillation. They are then in the form of colorless or only slightly colored liquids or solids.

Solid polyisocyanates are generally formed when cycloaliphatic diisocyanates are used as starting materials in the method of the invention. These solids are normally dissolved in one of the paint solvents listed below. The solutions—at the same concentration—have a lower viscosity than corresponding solutions of polyisocyanates of cycloaliphatic diisocyanates which predominantly contain isocyanurate groups.

The products prepared according to the invention are versatile starting materials for the production of polymers such as plastics, optionally foamed ones, and paints, coating materials, adhesives and additives.

These products, optionally in NCO-blocked form, are particularly appropriate for making single and dual-component polyurethane paints, since they have lower viscosity than polyisocyanates of the trimer type but otherwise equally good or improved properties. They may be used for this purpose either pure or combined with other known isocyanate derivatives such as uretdione, biuret, allophanate, isocyanurate, urethane or carbodiimide polyisocyanates in which the free NCO groups may optionally have been blocked.

The resultant plastics and coatings are extremely high-grade products with properties typical of prior art systems.

When used for example as cross-linking components in 2 component coatings the products according to the invention are generally combined with known OH and/or NH components from 2 component polyurethane systems, for example hydroxy-functional polyesters, polyacrylates, polycarbonates, polyethers, polyurethanes and polyfunctional amines. However they may equally be used as single components for example for making moisture-curing plastics and coatings.

Apart from the products according to the invention and any other binder components and paint solvents or paint solvent mixtures which may also be used, such as toluene, xylene, cyclohexane, chlorobenzene, butylacetate, ethylacetate, ethylglycolacetate, methoxypropylacetate, acetone, white spirit or higher substituted aromatics (trade names Solventnaphtha, Solvesso, Shellsol, Isopar, Nappar, Diasol), the coatings may contain further additives, for example wetting agents, flow control agents, anti-skinning agents, anti-foam agents, flatting agents, viscosity regulators, pigments, dyes, UV absorbers, catalysts and stabilizers to prevent thermal effects and oxidation.

The isocyanates prepared according to the invention may preferably be in the production of polyurethane plastics and coatings or as additives for inclusion in many different materials such as wood, plastic, leather, metal, paper, concrete, masonry, ceramics and textiles.

The invention is further illustrated but is not intended to be limited by the following examples in which all parts and percentages are by weight unless otherwise specified.

EXAMPLES

The NCO content of the resins described in the examples and comparative examples was determined by titration to DIN 53 185.

The dynamic viscosities were determined at 23° C. with viscometer VT 550, plate-cone measuring arrangement PK 100 produced by Haake. Readings were taken at different shear speeds to ensure that the flow properties of the inventive polyisocyanate mixtures described and those of the comparative products correspond to the ideal Newtonian liquids. Therefore, the shear speed did not need to be given.

The stated mol % or molar ratio of different types of structure to each other was based on NMR spectroscopic measuring. Unless otherwise specified it always referred to the sum of the types of structure formed from the previously free NCO groups by the modifying reaction (Oligomerization). Readings are taken on Bruker's DPX 400 apparatus on approx. 5% specimens ($^1$H-NMR) and approx. 50% specimens ($^{13}$C-NMR) in dry $CDCl_3$ at a respective frequency of 400 MHz ($^1$H-NMR) and 100 MHz ($^{13}$C-NMR). Small quantities of tetramethylsilane in the solvent with a $^1$H-chemical displacement of 0 ppm ($^1$H-NMR) and the solvent itself ($CDCl_3$) with a displacement of 77.0 ppm ($^{13}$C-NMR) were respectively taken as a reference for the ppm scale. Data on chemical displacement of the compounds in question were taken from the literature (cf. *Die Angewandte Makromolekulare Chemie* 1986, 141, 173–183 and literature quoted therein) or obtained by measuring model substances. The 3,5-dimethyl-2-methylimino-4,6-diketo-1,3,5-oxadiazin (a methylisocyanate trimer of the iminooxadiazindione type) obtainable from methylisocyanate by analogy with the method described in *Ber. d. dtsch. Chem. Ges.* 1927, 60, 295 showed the following respective NMR chemical displacements (in ppm): 3.09, 3.08, 2.84 ($^1$H-NMR, C$\underline{H}_3$) and 148.3, 144.6, 137.3 ($^{13}$C-NMR, $\underline{C}$=O/$\underline{C}$=N). Iminooxadiazindiones from aliphatic diisocyanates such as HDI have very similar ($^{13}$C-NMR) chemical displacements of the $\underline{C}$=O/$\underline{C}$=N ring atoms and should undoubtedly be distinguished as such from other secondary products of isocyanate.

The greater part of the reactions were carried out with HDI as the starting material by way of example. This was done only to clarify the advantages of the method of the invention and does not imply any restriction of the invention to the systems or reaction conditions described.

Preparation of the Catalyst

Sodium-1,2,4-triazolate is commercially available from Aldrich or can be produced by deprotonizing 1,2,4-triazole for example with a methanol solution of sodium methanolate, Na$^+$MeO$^-$. The resultant methanol solutions of the sodium salt were used as such for catalysis, optionally after preliminary recrystallization of the salt, and were also used with a counter-ion to the azolate anion other than the Na$^+$cation, for producing catalyst systems. By reacting NH-acid neutral compounds with other alkaline or alkaline earth alkoxides or hydroxides (Li, K, NH$_4$, Mg and others) further catalyst systems can be generated, and these may be used both in the reaction according to the invention and for producing catalyst systems with a counter-ion to the azolate anion other than the above-mentioned alkaline or alkaline earth cations.

Synthesis of a tetrabutylphosphonium derivative is described as an example. Other alkaline, tetraalkylammonium and phosphonium derivatives can be obtained in just the same way.

Tetrabutylphosphonium-1,2,4-triazolate

In a 3-necked flask agitator with a mechanical stirrer, an internal thermometer and a reflux cooler connected to an inert gas plant (nitrogen) 0.1 mol (18 g) of a 30% solution of sodium methanolate in methanol (produced by Aldrich) was dripped into 0.1 mol (6.9 g) of 1,2,4-triazole (Aldrich) dissolved in 20 ml methanol, at ambient temperature. When it had all been added agitation was continued for an hour at ambient temperature, then 0.1 mol (41.3 g) of a 71.4% solution of tetrabutyl-phosphonium chloride, Bu$_4$P$^+$ Cl$^-$, in isopropanol (trade name Cyphos 443P, produced by Cytec) was added drop by drop. Precipitation of sodium chloride commenced as soon as the first drops of tetrabutylphosphonium chloride solution were added. When all the solution was added the mixture was agitated for a further hour at ambient temperature, filtered and reduced in a rotary evaporator (bath temperature <50° C., approx. 1 mbar). The residue was filtered again and the resultant clear, almost colorless liquid was titrated with 0.1 n HCl against phenolphthalein. It contained 73% tetrabutylphosphonium-1,2,4-triazolate. The desired concentration was obtained by adding more methanol and/or other catalyst solvents. The solutions generally contained small quantities of methanol from the above-mentioned synthesis as well as the alcohol listed in Table 1.

Other azolate systems based on 1,2,3-triazolates, such as benzotriazolates could be obtained in just the same way from the basic neutral compounds containing NH groups. The content of active catalyst was determined, after processing, by simple acidimetric titration with 0.1 n HCl. A summary of the catalysts used in the examples is given in Table 1.

TABLE 1

Summary of catalysts

| No | Cation | Anion | Solvent | Concentration [%] |
|---|---|---|---|---|
| 1 | Na | 1,2,3-triazolate | i-PrOH | 3.3 |
| 2 | K | 1,2,34riazolate | i-PrOH | 10 |
| 3 | Bu$_4$P | 1,2,3-triazolate | i-PrOH | 26.4 |
| 4 | C$_{14}$H$_{29}$(C$_6$H$_{13}$)$_3$P | 1,2,triazolate | 1-methoxy-2-propanol | 83 |
| 5 | Me$_4$N | 1,2,4-triazolate | n-BuOH | 5.0 |
| 6 | Et$_3$NBz | 1,2,4-triazolate | 2-ethyl-hexanol | 26.5 |
| 7 | Bu$_4$P | 1,2,4-triazolate | 2-ethyl-hexanol | 10 |
| 8 | C$_{14}$H$_{29}$(C$_6$H$_{13}$)$_3$P | 1,2,4-triazolate | 1-methoxy-2-propanol | 55.1 |
| 9 | Na | Benzotriazolate | i-PrOH | 20 |
| 10 | Bu$_4$P | Benzotriazolate | i-PrOH | 32.4 |
| 11 | Bu$_4$P | Benzotriazolate | 2-ethylhexanol | 37.6 |
| 12 | Bu$_4$P | Pyridinotriazolate | 1-methoxy-2-propanol | 57.4 |
| 13 | BzMe$_3$N$^+$ | Pyridinotriazolate | MeOH | 47.5 |

Example 1

Preparation of HDI Polyisocyanates (According to the Invention)

In each case 200 g (1.19 mol) of freshly distilled HDI were first agitated at 60° C. under vacuum (0.1 mbar) for 1 hour to remove dissolved gases, then ventilated with dry nitrogen and brought to the temperature referred to as "min" in Table 2 with agitation. It was next mixed drop by drop with the catalyst given in Table 2 until the reaction starts, shown by a rise in temperature of one to two degrees. Details of the catalyst and reaction conditions can be found in Table 2. When the required degree of conversion was reached, detected by the refractive index $n_{20}^D$, further reaction was terminated by adding the stoichiometric quantity of the stopper listed in Table 2 to the quantity of catalyst used in each case. The unconverted monomer was then removed from the crude products leaving a residual content of less than 0.5% by thin-layer distillation at 120° C./0.1 mbar in a short-distance evaporator. The structural composition of the product was then analyzed as described above. The residual monomer content determined by gas-liquid chromatography was less than 0.5% in all the products prepared according to the invention, and did not increase to values above 0.5% within 3 months even when the product is stored either at ambient temperature or at 50° C. in a drying cabinet. Selected analytical and calculated results are set out in Table 2. There was no evidence of uretone imines in any of the products.

Example 2

Preparation of HDI Polyisocyanates with Varying Conversion (According to the Invention)

The procedure described in Example 1 was followed using catalyst solution 7. Six 1–2 g samples were taken during the reaction until shortly before gel point was reached and were stopped with an approx. 100% excess of di-n-butylphosphate. Conversion was determined by determining the content of non-converted monomer by gas-liquid chromatography. The molar ratio of the types of structure formed was analyzed by $^{13}$C-NMR spectroscopy in approx. 80% solution in CDCl$_3$. It is virtually unchanged throughout said conversion range. There was no evidence of uretone imines (cf. Table 3).

TABLE 3

Dependence of product composition (types of structure) on conversion in the preparation of HDI polyisocyanates according to the invention

| Example 2 | Resin yield[1] [%] | $^{13}$C-NMR [mol % of secondary products of NCO][2] | | |
|---|---|---|---|---|
| | | Uretdiones | Isocyanurates | Iminooxa-diazindiones |
| A | 30.6 | 39.1 | 49.9 | 11.0 |
| B | 53.8 | 38.6 | 51.1 | 10.4 |
| C | 62.3 | 40.3 | 49.8 | 9.9 |
| D | 75.5 | 40.9 | 49.2 | 9.8 |

[1]Resin yield = 100 − HDI content, the latter is determined by gas-liquid chromatography
[2]Sum of uretdione, isocyanurate and iminooxadiazindione structures standardised to 100%

TABLE 2

Data on the production and selected properties of the HDI polyisocyanates prepared according to the invention

| Example 1 | No. (cf. Table 1) | Quantity relative to HDI [ppm] | T [° C.] min | T [° C.] max | Stopper[1] | Reaction time till stopper added [h] | $n_D^{20}$ when stopper added |
|---|---|---|---|---|---|---|---|
| a | 1 | 100 | 58 | 64 | DBP | 1.5 | 1.4600 |
| b | 2 | 100 | 58 | 67 | DBP | 0.5 | 1.4599 |
| c | 3 | 240 | 60 | 66 | DBP | 0.5 | 1.4662 |
| d | 3 | 1200 | 58 | 72 | DBP | 3.5 | 1.4775 |
| e | 4 | 1500 | 59 | 69 | TOS | 3.5 | 1.4668 |
| f | 4 | 1500 | 59 | 71 | DBP | 4.1 | 1.4665 |
| g | 4 | 2500 | 79 | 85 | DBP | 6.5 | 1.4654 |
| h | 5 | 130 | 60 | 65 | DBP | 5.0 | 1.4665 |
| i | 6 | 1020 | 57 | 67 | DBP | 1.0 | 1.4661 |
| j | 7 | 1050 | 57 | 60 | DBP | 3.0 | 1.4652 |
| k | 8 | 1000 | 59 | 74 | TOS | 1.75 | 1.4645 |
| l | 9 | 100 | 60 | 65 | DBP | 1.5 | 1.4661 |
| m | 10 | 1100 | 60 | 70 | DBP | 1.0 | 1.4671 |
| n | 11 | 1690 | 54 | 67 | DBP | 19.0 | 1.4924 |
| o | 11 | 1510 | 59 | 68 | DBP | 1.5 | 1.4771 |
| p | 11 | 5060 | 96 | 107 | DBP | 5.0 | 1.4759 |
| q | 12 | 570 | 39 | 41 | DBP | 8.5 | 1.4658 |
| r | 12 | 570 | 40 | 51 | DBP | 1.5 | 1.4674 |
| S | 12 | 570 | 39 | 41 | DBP | 4 | 1.4659 |
| T | 12 | 590 | 20 | 30 | DBP | 3 | 1.4665 |
| U | 12 | 550 | 59 | 60 | DBP | 7 | 1.4658 |
| V | 13 | 500 | 26 | 62 | DBP | 4.5 | 1.4664 |

| Example 1 | Yield[2] [%] | NCO content [%] | Viscosity at 23° C. [mpas] | Iminooxa-diazindiones [mol %][3] | Isocyanurates [mol %][3] | Uretdiones [mol %][3] |
|---|---|---|---|---|---|---|
| a | 17.8 | 22.9 | 570 | 7 | 67 | 27 |
| b | 18.1 | 23.1 | 330 | 10 | 49 | 40 |
| c | 30.6 | 22.6 | 290 | 21 | 35 | 44 |
| d | 54.9 | 20.7 | 775 | 25 | 32 | 43 |
| e | 34.1 | 23.0 | 276 | 27 | 22 | 51 |
| f | 33.2 | 23.0 | 265 | 27 | 22 | 52 |

TABLE 2-continued

Data on the production and selected properties of the HDI polyisocyanates prepared according to the invention

| | Data on catalyst | | | Data on reaction | | |
|---|---|---|---|---|---|---|
| | | Quantity | | | | |
| g | 30.8 | 22.8 | 203 | 23 | 20 | 58 |
| h | 30.1 | 22.2 | 1700 | 7 | 80 | 13 |
| i | 29.9 | 22.4 | 940 | 13 | 61 | 26 |
| j | 29.1 | 21.8 | 782 | 15 | 57 | 28 |
| k | 28.3 | 22.6 | 1040 | 7 | 72 | 21 |
| l | 30.8 | 22.0 | 685 | 11 | 56 | 33 |
| m | 34.2 | 22.2 | 508 | 18 | 47 | 35 |
| n | 75.2 | 18.1 | 6600 | 28 | 35 | 36 |
| o | 54.2 | 20.1 | 682 | 27 | 26 | 47 |
| p | 49.6 | 20.6 | 950 | 23 | 35 | 42 |
| q | 29.8 | 22.6 | 550 | 15 | 51 | 34 |
| r | 32.9 | 22.2 | 1500 | 9 | 74 | 17 |
| s | 30.7 | 22.5 | 458 | 19 | 42 | 39 |
| t | 29.7 | 22.6 | 1190 | 12 | 74 | 14 |
| u | 27.1 | 21.4 | 370 | 23 | 28 | 49 |
| v | 31.9 | 22.7 | 520 | 11 | 44 | 45 |

[1]DBP = dibutylphosphate, TOS = p-toluene sulphonic acid
[2]Resin yield = quantity of resin divided by (sum of distilled monomer and resin)
[3]Determined by $^{13}$C-NMR spectroscopy, sum of the 3 types of structure standardised to 100%.

Example 3

Preparation of H$_6$XDI-polyisocyanates (According to the Invention)

100 g (0.51 mol) of 1,3-bis(isocyanate methyl) cyclohexane (H$_6$XDI produced by Aldrich) were first pretreated as described in Example 1 then oligomerized at an internal temperature of 90° C. by adding 0.045 mmol of sodium benzotriazolate (catalyst solution 9). Six 1–2 g samples were taken during the reaction until shortly before gel point was reached and were stopped with an approx. 100% excess of di-n-butylphosphate. The content of non-converted monomer was determined by gas-liquid chromatography (first sample 71.2%, diminishing successively to the sixth sample 43.3%). The molar ratio of the types of structure formed was analyzed by $^{13}$C-NMR spectroscopy in approx. 80% solution in CDCl$_3$. It was virtually unchanged throughout said conversion range. Uretone imines could not be detected.

Example 4

Preparation of TMDI Polyisocyanates (According to the Invention)

100 g (0.48 mol) of 1,6-diisocyanate-2,2(4),4-trimethylhexane (TMDI produced by Aldrich) were oligomerized just as in Example 3 and analyzed (5 samples, conversion range from 71.2% monomer, successively diminishing to the fifth sample at 35.1%). The molar ratio of the types of structure formed was analyzed by $^{13}$C-NMR spectroscopy in approx. 80% solution in CDCl$_3$. It was virtually unchanged throughout said conversion range. Uretone imines could not be detected.

Example 5

Example of an Application 10 g of a polyisocyanate obtained as in Example 1h were first mixed with 50 mg of a 10% solution of dibutyl tin dilaurate in butylacetate, then mixed with 24.7 g of an acrylate containing hydroxyl groups and made from 40% styrene, 34% hydroxyethylmethacrylate, 25% butylacrylate and 1% acrylic acid with an OH content to DIN 53 240 of 3%, an acid number to DIN 53402 of 8 and a viscosity of 3,500 mPas at 23° C. (as a 70% solution in butylacetate) (NCO:OH ratio=1,1:1). The mixture was applied to a glass plate in a layer 120 μm thick and subjected to forced drying for 30 minutes at 60° C. A clear, high-gloss paint film was obtained, which was undamaged after 100 double strokes with MEK and could not be scratched with a pencil of hardness HB.

Comparative Examples, Not According to the Invention

Comparative Example 1
Phosphine catalysis (cf. DE-A 16 70 720)
1a) to 1c)

In each case 200 g (1.19 mol) of freshly distilled HDI were first agitated at 60° C. under vacuum (0.1 mbar) for 1 hour to remove dissolved gases, then ventilated with dry nitrogen. It was mixed with 3 g (14.8 mmol) of tri-n-butylphosphine (Cytop® 340 produced by Cytec) at a) 60° C., b) 120° C. or c) 180° C. and reacted under a nitrogen shield until the refractive index of the crude solution given in Table 4 was reached. Further reaction was then inhibited (stopped) by adding 4 g (26 mmol) of p-toluene sulphonic acid methylester in each case, for which purpose agitation was continued for approximately an hour at 80° C. until the refractive index of the mixture showed no more changes. The unconverted monomer was then removed from the crude products by thin-layer distillation at 120° C./0.1 mbar in a short-distance evaporator. The composition of the product was analyzed by $^{13}$C-NMR in respect of the types of structure formed. The residual monomer content was measured by gas-liquid chromatography. It was determined again after three weeks' storage at ambient temperature (20 to 25° C.) then after two weeks' storage in a drying cabinet at 50° C. Selected analytical and calculated results are set out in Table 4.

1d)

The reaction was carried out as described in 1a) except that an aliquot of the reaction mixture was taken at the refractive index values of the crude material given in Table 4, the reaction was "stopped" with the corresponding aliquot of p-toluene sulphonic acid methylester as described above, and these partial quantities with different conversion were analyzed separately (Examples 1d-1 to 1d-7 in Table 4). The remaining main part of the reaction batch was stopped as described above on reaching a refractive index of 1.4913, worked up and analyzed (1d-8). Selected analytical and calculated results are set out in Table 4. It will be seen immediately that the composition of the product in the phosphine catalysis is highly dependent on conversion and reaction temperature. The formation of uretone imines at quite a high reaction temperature is particularly disadvantageous.

Comparative Example 2
Catalysis with N-silyl Compounds (cf. EP-A 57 653)

In each case 200 g (1.19 mol) of freshly distilled HDI weres first agitated under vacuum (0.1 mbar) for 1 hour to remove dissolved gases, then ventilated with dry nitrogen and agitated with the quantity of hexamethyldisilazane (HMDS) given in Table 5 at the temperature and for the time stated in Table 5 until the refractive index of the crude solution given in Table 5 was reached. It was then mixed with the stoichiometric quantity of deactivator ("stopper", cf. Table 5) for the quantity of HMDS used, agitated at the stated temperature for a further hour, processed by thin-layer distillation and analyzed as described above.

It will be seen immediately that the proportion of uretdione to isocyanurate structures is very highly dependent on conversion and hard to reproduce even under very similar experimental conditions, at least in laboratory tests. Iminooxadiazindiones can just be detected in the resins by NMR spectroscopy (less than 1 mol%).

TABLE 4

Results of tributylphosphine-catalyzed HDI oligomerization (not according to the invention)

| | | Resin | | | Uretone imines | | | |
|---|---|---|---|---|---|---|---|---|
| Comparative example 1 | $N_D^{20}$ (stop) | Yield [%] | NCO content [%] | Viscosity [mPas]$^{23°\,C.}$ | HDI content [%] | [mol %][1] n.t.[3] | Uretdiones [mol %][1] | Isocyanurates [mol %][1] | Iminooxadiazindione [mol %][1] |
| a | 1.4732 | 46.3[7] | 20.2 | 240 | 0.1/0.1/0.2[2] | | 69 | 22 | 9 |
| b | 1.4731 | 40.0[7] | 20.6 | 1250 | 0.3/0.3/0.4[2] | 3 | 28 | 47 | 22 |
| c | 1.4768 | 39.4[7] | 19.5 | 5200[4] | 2.7/3.8/5.4[2] | 54 | 4 | 30 | 12 |
| d-1 | 1.4542 | 6.5[6] | | n.d.[5] | | n.t.[3] | 91 | 6 | 4 |
| d-2 | 1.4604 | 24.7[6] | | n.d.[5] | | n.t.[3] | 88 | 9 | 3 |
| d-3 | 1.4663 | 40.6[6] | | n.d.[5] | | n.t.[3] | 85 | 11 | 4 |
| d-4 | 1.4717 | 55.9[6] | | n.d.[5] | | n.t.[3] | 81 | 13 | 5 |
| d-5 | 1.4755 | 57.2[6] | | n.d.[5] | | n.t.[3] | 79 | 15 | 6 |
| d-6 | 1.4807 | 63.7[6] | | n.d.[5] | | n.t.[3] | 76 | 18 | 7 |
| d-7 | 1.4860 | 68.1[6] | | n.d.[5] | | n.t.[3] | 72 | 20 | 8 |
| d-8 | 1.4913 | 75.1[7] | 16.9 | 6500 | 0.05/0.1/0.2[2] | n.t.[3] | 68 | 23 | 9 |

[1] $^{13}$C-NMR determined by spectroscopy; sum of uretone imine, uretdione, isocyanurate and iminooxadiazindione structures standardised to 100%
[2] Residual monomer content after: processing/3 weeks' storage at ambient temperature/further 2 weeks' storage at 50° C.
[3] n.t. = not traceable
[4] heterogeneous, turbid product
[5] n.d. = not determined
[6] Resin yield = 100 - HDI content, the latter determined by gas-liquid chromatography
[7] Resin yield = Quantity of resin divided by (sum of distilled monomer and resin)

TABLE 5

Results of HMDS-catalyzed HDI oligomerization (not according to the invention)

| | HMDS | Reaction | | | Stopper | Resin | | | $^{13}$C-NMR [mol % of secondary products of NCO][2] | |
|---|---|---|---|---|---|---|---|---|---|---|
| Comparative example 2 | [% relative to HDI] | temp [° C.] | time [h] | $n_D^{20}$ at stop | equimolar to HMDS | viscosity [mPas]$^{@\,23°\,C.}$ | yield[1] [%] | NCO content [%] | Uretdiones | Isocyanurates |
| a | 0.4 | 112–125 | 5 | 1.4620 | $H_2O$ | 760 | 21.5 | 23.6 | 21 | 79 |
| b | 0.4 | 112–124 | 5 | 1.4632 | $H_2O$ | 1120 | 24.0 | 23.4 | 12 | 88 |
| c | 0.4 | 110–122 | 5 | 1.4623 | $H_2O$ | 1010 | 20.3 | 23.5 | 11 | 89 |
| d | 0.4 | 115–123 | 4.5 | 1.4600 | $H_2O$ | 722 | 18.3 | 23.5 | 16 | 84 |
| e | 0.4 | 114–127 | 4 | 1.4633 | $H_2O$ | 1210 | 25.6 | 23.1 | 11 | 89 |
| f | 0.8 | 114–128 | 3.5 | 1.4670 | $H_2O$ | 1620 | 31.5 | 22.2 | 12 | 88 |
| g | 1 | 114–130 | 4 | 1.4715 | $H_2O$ | 2750 | 39.0 | 21.9 | 10 | 90 |
| h | 1.2 | approx. 120 | 6 | 1.4666 | BuOH | 2110 | 31.6 | 22.1 | 7 | 93 |
| i | 1.2 | 117–125 | 2 | 1.4637 | BuOH | 1610 | 25.6 | 23.3 | 5 | 95 |
| j | 1.2 | approx. 120 | 1.5 | 1.4617 | BuOH | 1370 | 22.5 | 23.7 | 6 | 94 |
| k | 1.2 | approx. 120 | 3.25 | 1.4658 | BuOH | 2380 | 31 | 22.7 | 3 | 97 |
| l | 1.2 | 118–122 | 5 | 1.4714 | BuOH | 3500 | 39.8 | 22 | 4 | 96 |
| m | 1.2 | approx. 120 | 7.5 | 1.4742 | BuOH | 5290 | 44.2 | 21.8 | 4 | 96 |
| n | 2 | approx. 120 | 7 | 1.4836 | BuOH | 34100 | 64.5 | 18.8 | 3 | 97 |
| o | 2.5 | approx. 120 | 7 | 1.4926 | BuOH | 180000 | 77.8 | 17.8 | 2 | 98 |

[1] Resin yield = quantity of resin divided by (sum of distilled monomer and resin)
[2] Sum of the two types of structure standardised to 100%

Although the invention has been described in detail in the foregoing for the purpose of illustration, it is to be understood that such detail is solely for that purpose and that variations can be made therein by those skilled in the art without departing from the spirit and scope of the invention except as it amy be limited by the claims.

What is claimed is:

1. A method of preparing an aliphatic polyisocyanate comprising converting an aliphatic diisocyanate to a polyisocyanate in the presence of a catalyst, wherein the catalyst comprises a saline compound having 5 to 97.1 wt. %, based on the weight of the anion, of a 1,2,3- and/or a 1,2,4-triazolate (calculated as $C_2N_3$, molecular weight 66) in the anion.

2. The method according to claim 1 wherein the saline compound comprises a triazolate of formula (I) and/or (II)

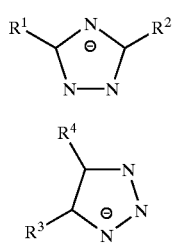

where
R$^1$, R$^2$, R$^3$ and R$^4$ independently represent hydrogen, fluorine, chlorine, bromine, nitro, a saturated or unsaturated aliphatic or cycloaliphatic radical, a substituted or unsubstituted aromatic or araliphatic radical having up to 20 carbon atoms and optionally up to 3 heteroatoms selected from the group consisting of oxygen, sulphur and nitrogen and which are optionally substituted by halogen atoms or nitro groups,
and where
R$^3$ and R$^4$, combined and together with the carbon atoms of the 1,2,3-triazolate five-ring compound and optionally a further nitrogen atom or an oxygen atom, form annellated rings with 3 to 6 carbon atoms.

3. The method of claim 1 wherein the saline compound comprises a triazolate of formula (I), where in R$^1$ and R$^2$ the saturated aliphatic or cycloaliphatic radical and the substituted or unsubstituted aromatic or araliphatic radical has up to 12 carbon atoms and optionally up to 3 heteroatoms.

4. The method of claim 1 wherein the saline compound comprises the triazolate of formula (II), where in R$^3$ and R$^4$ the saturated aliphatic or cycloaliphatic radical and the substituted or unsubstituted aromatic or araliphatic radical has up to 12 carbon atoms and optionally up to 3 heteroatoms.

5. The method of claim 1 wherein the saline compound comprises salts of 1,2,4-triazole, 1,2,3-triazole, 1,2,3-benzotriazole and/or pyridine triazole.

6. The method of claim 1 wherein the saline compound comprises a cation selected from the group consisting of alkaline metal cations, alkaline earth metal cations, and monovalent ammonium and phosphonium cations of formula (III)

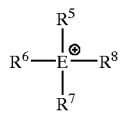

where

E represents nitrogen or phosphorus and

R$^5$, R$^6$, R$^7$ and R$^8$ independently represent a saturated aliphatic or cycloaliphatic radical or a substituted or unsubstituted aromatic or araliphatic radical having up to 18 carbon atoms.

7. A polyisocyanate obtained by the method of claim 1.

8. The polyisocyanate of claim 7 wherein the aliphatic diisocyanates have 4 to 20 carbon atoms in the carbon network apart from the NCO groups, and the NCO groups are bonded to primary aliphatic carbon atoms.

* * * * *